Figure 1:
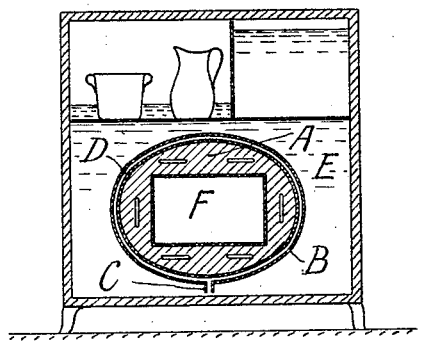

June 30, 1925.

A. SAXEGAARD 1,544,274

DOMESTIC COOKER

Filed Feb. 14, 1924

Inventor
Andreas Saxegaard,
By [signature]
Atty.

Patented June 30, 1925.

1,544,274

UNITED STATES PATENT OFFICE.

ANDREAS SAXEGAARD, OF CHRISTIANIA, NORWAY.

DOMESTIC COOKER.

Application filed February 14, 1924. Serial No. 692,693.

*To all whom it may concern:*

Be it known that I, ANDREAS SAXEGAARD, a subject of the King of Norway, residing at Middelthunsgate 17, Christiania, Norway, have invented certain new and useful Improvements in Domestic Cookers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in domestic cookers of the kind in which water is utilized as an accumulator of heat, a water bath, especially of the kind in which the temperature of the water being maintained at a suitable temperature by electric means, being used as a heat reservoir.

The invention is however also to some degree applicable in cases where another source of heat is used, for instance gas or oil. I shall however in the following mainly describe the invention as it is used when electric heating means are applied.

The invention has for its object improvements whereby the transmission of heat from the electrical heating elements to the water is automatically regulated according to the temperature held by the water at any time, and also automatic regulating means whereby the source of heat is cut out, when the temperature of the water has been raised to the maximum temperature required.

My invention also comprises the idea of combining with the water bath serving as a heat accumulator, a heat accumulator consisting of a solid body capable of being raised to a temperature higher than the boiling point of water.

As the invention, as it will be understood from the above, is applicable in connection with different kind of cookers, I have shown in the drawing only examples of its application in different cases and not complete drawings of cookers as they should be constructed. Thereby the description of the invention is simplified and the understanding of the same is made easier.

Figure 2:
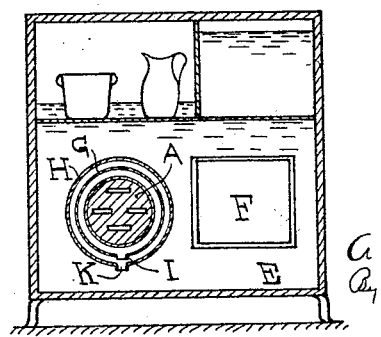

In the drawings Fig. 1 is a vertical section of a domestic cooker, in which cooker the principles of my invention has been applied on a cooker of the type shown in my U. S. Patent No. 1,471,573. Fig. 2 is a vertical section of a modified form of the cooker shown in Fig. 1. The heating apparatus shown in the drawing, is in this instance an electrical heater in which heat is accumulated in a metal body.

In the drawing E designates the water reservoir of the cooker, F the oven shown in Fig. 1 formed within a body A, which may consist of metal or any other suitable material. Imbedded in this body A is an electrical heating element, or elements A'. The body A is not in direct contact with the water in the reservoir E, but is placed within a tubular body B of the same shape as the body A, but of greater diameter so that a space D is formed between the body A and the body B. At its lowest point, this space has openings C through which it communicates with the water in the reservoir. The function of this device is as follows:

The space D is normally filled with water. When the body A is being warmed by the electrical elements, this heat serves not only to keep the oven F at a suitable temperature, but the heat is also transferred through the water space D to the water in the reservoir E. When the water in the reservoir has reached a temperature not far from the boiling point, steam will be created in the space D and this steam will by and by expel the water from the space through the openings C. The space D will then only contain steam and this steam will serve as a heat insulator between the body A and the water in the reservoir.

The supply of electrical energy to the electrical heating elements in the body A, can now be cut off for a considerable time without putting the cooker out of operative condition. The body A which may have attained a temperature of 400° C will for a long time keep the water at a suitable temperature for the cooking, and as soon as the temperature of the water commences to fall, steam will condense within the space D and this will cause water to again enter the space D through the openings C, so that the conduction of heat from A to E will again be increased.

It will be understood that this part of the invention now having been described, is not necessarily combined with the forming of a space F serving as oven within the body A.

The said body A may be a solid body and the oven F arranged at another point in the cooker as shown in Fig. 2.

The important point in this part of the invention is the combined use of a solid body and a liquid body as heat accumulators, in such way that the heat accumulated in the solid body (for instance during night time) is automatically transferred to the water reservoir as the temperature of the latter falls.

In this modification the solid body A serving as an accumulator of heat, supplied to it through the electrical heating elements, is enveloped in a double water mantle there being two concentric waterspaces formed around the body, by way of the two tubular casings G, H. Both of these casings have openings I, K at their lowest point through which they communicate with the surrounding water reservoir E. This device acts in the following manner.

When the body A has reached a high temperature and so much heat has been transmitted to the water reservoir that the latter is getting hot, the temperature in the water space nearest the body will reach the boiling point, steam is created and the water expelled from the space. The latter will then act as an insulator and it will take considerable time before the body has attained a temperature sufficiently high to form steam in the exterior water space. When this occurs, also this space will be filled with steam and both spaces will now act as an insulator, so that the solid body serving to accumulate heat can come up to a considerable high temperature, before the transmission of heat from it to the water reservoir will be sufficient to cause evaporation. The cooker will now be loaded with heat for a long run and during use the temperature of the water in the reservoir will automatically be kept near the boiling point, the two water spaces around the hot body successively taking up water as the temperature of the water in the water reservoir and the temperature of the heat accumulator sinks.

What I claim is:

1. In a domestic cooker, a liquid reservoir serving as a heat accumulator and as a means to transfer heat to cooking vessels, a body immersed in the liquid adapted to serve as a holder for heating elements and to transfer heat to the liquid, and a casing enveloping said body having an opening therein successively constituting an inlet and exit for the liquid under varying temperatures of said body.

2. In a domestic cooker, a water reservoir, a body immersed in the water, heating elements in the body, a casing enveloping said body and co-operating with the latter to form a chamber, said casing having an opening through which the chamber communicates with the reservoir whereby water is successively admitted to and expelled from the chamber under varying conditions of temperature.

3. In a domestic cooker, a water reservoir, a body immersed in the water having sufficient volume to serve as a primary accumulator of heat, heating elements in said body, a casing surrounding the latter forming a chamber and having an opening through which the chamber communicates with the reservoir whereby water is successively admitted to and expelled from the chamber under varying conditions of temperature of said body.

4. In a domestic cooker, a water reservoir, a heat accumulating body immersed in the water, a casing enveloping the body and spaced therefrom to form a chamber around the latter, said casing having an opening at its lowest point through which water from the reservoir is admitted to the chamber, and heating elements in said body adapted to heat the latter sufficiently to generate steam in the chamber and expel the water from the latter.

5. In a domestic cooker, a water reservoir, a heat accumulating body immersed in the water, a casing surrounding the body communicating with the reservoir through a single opening in the bottom of the casing and constituting a water trap, around the body, and heating elements in the body adapted to heat the latter sufficiently to convert the trapped water into steam.

6. In a domestic cooker, a water reservoir, a heat accumulating body immersed in the water, a casing surrounding the body communicating with the reservoir through a single opening in the bottom of the casing and constituting a water trap around the body, heating elements in the body adapted to heat the latter sufficiently to convert the trapped water into steam and a cooking receptacle mounted in the reservoir.

7. In a domestic cooker, a water reservoir, a heat accumulating body immersed in the water of the reservoir, a casing enveloping said body forming a chamber for the reception of water from the reservoir, heating elements in said body adapted to convert the water in the chamber into steam, and an auxiliary casing surrounding the chamber and communicating with the latter and with the reservoir.

8. In a domestic cooker, a water reservoir, a heat accumulating body immersed in the water of the reservoir, a casing communicating with the reservoir and forming a water trap around said body, an auxiliary casing communicating with the reservoir and with the water trap, and heating elements in said body adapted to heat the latter sufficiently to convert the water in the trap into steam, whereby steam is generated within the auxiliary casing.

9. In a domestic cooker, a water reservoir, a heat accumulating body immersed in the water of the reservoir, a casing forming an annular chamber around said body, and communicating with the reservoir through an opening at its lowest point, an auxiliary casing forming a concentric chamber around the annular chamber and communicating with the latter and with the reservoir, and heating elements mounted in the heat accumulating body adapted to generate steam in the chambers.

10. In a domestic cooker, a water reservoir, a heat accumulating body immersed in the water of the reservoir, a casing forming an annular chamber around said body and communicating with the reservoir through an opening at its lowest point, an auxiliary casing forming a concentric chamber around the annular chamber and communicating with the latter and with the reservoir, and heating elements mounted in the heat accumulating body to generate steam in the annular chamber and in the concentric chamber successively.

In testimony that I claim the foregoing as my invention, I have signed my name in presence of two subscribing witnesses.

ANDREAS SAXEGAARD.

Witnesses:
S. GULLICKSEN,
GULBORG GULBRANDSEN.